United States Patent
Ray et al.

(10) Patent No.: US 10,725,173 B2
(45) Date of Patent: Jul. 28, 2020

(54) AIRBORNE ICE DETECTOR USING QUASI-OPTICAL RADAR

(71) Applicant: Rosemount Aerospace Inc., Burnsville, MN (US)

(72) Inventors: Mark Ray, Burnsville, MN (US); Mark Sherwood Miller, Lakeville, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 915 days.

(21) Appl. No.: 15/176,659

(22) Filed: Jun. 8, 2016

(65) Prior Publication Data

US 2017/0356998 A1 Dec. 14, 2017

(51) Int. Cl.
*G01S 13/95* (2006.01)
*G01S 7/481* (2006.01)
(Continued)

(52) U.S. Cl.
CPC ............ *G01S 13/953* (2013.01); *B64D 15/20* (2013.01); *G01S 7/026* (2013.01); *G01S 7/4812* (2013.01);
(Continued)

(58) Field of Classification Search
CPC ...... G01S 13/953; G01S 7/026; G01S 7/4812; G01S 7/4815; G01S 7/499; G01S 13/865;
(Continued)

(56) References Cited

U.S. PATENT DOCUMENTS 5,028,929 A * 7/1991 Sand ..................... G01S 13/106
342/26 B
5,214,438 A * 5/1993 Brusgard ................ F41G 7/008
343/725
(Continued)

FOREIGN PATENT DOCUMENTS

EP 1428046 B1 * 4/2006 ........... G01S 7/4802
EP 2184232 A2 5/2010
(Continued)

OTHER PUBLICATIONS

Cooper et al., "A Grating-Based Circular Polarization Duplexer for Submillimeter-Wave Transceivers", IEEE Microwave and Wireless Components Letters, vol. 22, No. 3, Mar. 2012.
(Continued)

*Primary Examiner* — Vladimir Magloire
*Assistant Examiner* — Nuzhat Pervin
(74) *Attorney, Agent, or Firm* — Kinney & Lange, P. A.

(57) ABSTRACT

An aircraft ice detection system is configured to determine a condition of a cloud and includes a radar system, a lidar system, optics and a dichroic filter. The radar system is configured to project quasi-optical radiation to the cloud and receive reflected quasi-optical radiation from the cloud. The lidar system is configured to project optical radiation to the cloud and receive reflected optical radiation from the cloud. The optics are configured to direct the quasi-optical radiation and the optical radiation to the cloud and receive the reflected quasi-optical radiation and the reflected optical radiation from the cloud. The dichroic filter is configured to direct the quasi-optical radiation from the radar system to the optics, direct the optical radiation from the lidar system to the optics, direct the reflected quasi-optical radiation from the optics to the radar system and direct the reflected optical radiation from the optics to the lidar system.

14 Claims, 4 Drawing Sheets

(51) Int. Cl.

| | |
|---|---|
| *G01S 7/499* | (2006.01) |
| *B64D 15/20* | (2006.01) |
| *G01S 13/86* | (2006.01) |
| *G01S 7/02* | (2006.01) |
| *G01S 17/95* | (2006.01) |
| *G02B 27/14* | (2006.01) |
| *G02B 27/28* | (2006.01) |

(52) U.S. Cl.
    CPC ............ *G01S 7/4815* (2013.01); *G01S 7/499* (2013.01); *G01S 13/865* (2013.01); *G01S 17/95* (2013.01); *G02B 27/141* (2013.01); *G02B 27/283* (2013.01); *Y02A 90/18* (2018.01); *Y02A 90/19* (2018.01)

(58) Field of Classification Search
    CPC ....... G01S 17/95; B64D 15/20; G02B 27/141; G02B 27/283; Y02A 90/18; Y02A 90/19
    USPC ........................................................ 342/26 B
    See application file for complete search history.

(56) References Cited

U.S. PATENT DOCUMENTS

| | | | | |
|---|---|---|---|---|
| 5,243,185 | A * | 9/1993 | Blackwood | G01N 21/211 250/225 |
| 5,285,256 | A * | 2/1994 | Nelson | G01S 17/04 356/342 |
| 5,307,077 | A * | 4/1994 | Branigan | G01S 13/4463 342/53 |
| 5,327,149 | A * | 7/1994 | Kuffer | G01S 13/86 342/53 |
| 5,488,375 | A * | 1/1996 | Michie | G01S 13/953 342/26 B |
| 5,621,410 | A * | 4/1997 | Gray | G01S 7/024 342/26 D |
| 5,973,649 | A * | 10/1999 | Andressen | H01Q 15/22 343/708 |
| 6,225,955 | B1 * | 5/2001 | Chang | H01Q 19/13 343/720 |
| 6,295,034 | B1 * | 9/2001 | Brown | H01Q 3/2658 343/781 CA |
| 6,377,202 | B1 * | 4/2002 | Kropfli | G01S 7/024 342/26 R |
| 6,377,207 | B1 * | 4/2002 | Solheim | G01W 1/02 324/640 |
| 6,606,066 | B1 * | 8/2003 | Fawcett | G01J 5/0815 343/725 |
| 7,283,791 | B2 * | 10/2007 | Nilsson | H04W 52/12 455/522 |
| 7,986,408 | B2 * | 7/2011 | Ray | B64D 15/20 356/342 |
| 8,144,325 | B2 * | 3/2012 | Ray | B64D 15/20 356/342 |
| 8,338,785 | B2 * | 12/2012 | Ray | B64D 15/20 250/338.1 |
| 8,604,963 | B1 * | 12/2013 | Kronfeld | G01S 13/95 342/26 B |
| 9,116,243 | B1 * | 8/2015 | Brown | G01S 7/4816 |
| 9,188,700 | B2 * | 11/2015 | Bunch | G01W 1/00 |
| 9,222,873 | B2 * | 12/2015 | Baumgardner | G01S 7/499 |
| 9,244,166 | B1 * | 1/2016 | Finley | G01S 13/953 |
| 9,295,245 | B1 * | 3/2016 | Guice | A01M 1/026 |
| 9,304,081 | B2 * | 4/2016 | Renno | G01N 21/3554 |
| 2004/0036630 | A1 * | 2/2004 | Jamieson | B64D 15/20 340/962 |
| 2007/0247612 | A1 * | 10/2007 | Pack | G01C 7/04 356/4.01 |
| 2008/0137058 | A1 * | 6/2008 | Cesare | G01S 7/4811 356/4.01 |
| 2009/0027651 | A1 * | 1/2009 | Pack | G01C 7/04 356/4.01 |
| 2010/0328143 | A1 * | 12/2010 | Kirk | G01W 1/04 342/26 B |
| 2010/0332056 | A1 * | 12/2010 | Kirk | G01W 1/04 701/14 |
| 2012/0274938 | A1 * | 11/2012 | Ray | B64D 15/20 356/342 |
| 2013/0103316 | A1 * | 4/2013 | Ray | G01S 17/95 702/3 |
| 2016/0356890 | A1 * | 12/2016 | Fried | G01S 17/42 |

FOREIGN PATENT DOCUMENTS

| | | | | |
|---|---|---|---|---|
| EP | 2518529 | A2 | 10/2012 | |
| GB | 2559885 | A * | 8/2018 | ............ B60W 40/02 |

OTHER PUBLICATIONS

Leal-Sevillano et al., "A 225 GHz Circular Polarization Waveguide Duplexer Based on a Septum Orthomode Transducer Polarizer", IEEE Transactions of Terahertz Science and Technology, vol. 3, No. 5, Sep. 2013.

James B. Mead et al., "Remote Sensing of Clouds and for with a 1.4-mm Radar", Journal of Atmospheric and Oceanic Technology, vol. 6, pp. 1090-1097, 1989.

Joseph Nemarich et al., "Backscatter and Attenuation by Falling Snow and Rain at 96, 140, and 225 GHz", IEEE Transactions of Geosceince and Remote Sensing, Vo., 26, No. 3, May 1988.

A. Battaglia et al., "G Band Atmospheric Radars: New Frontiers in Cloud Physics", Atmos. Meas. Tech., 7, 1527-1546, 2014.

Robin J. Hogan and Anthony J. Illingworth, "The Potential of Spaceborne Dual-Wavelength Radar to Make Global Measurements of Cirrus Clouds", J. Atmos Oceanic Tech, 1999, 16, 518-531.

S.L. Durden et al., "A Cloud and Precipitation Radar System Concept for the ACE Mission", 2011 California Institute of Technology.

Luke et al., "Detection of supercooled liquid in mixed-phase clouds using radar Doppler spectra", Journal of Geophysical Research, vol. 115, No. D19, Oct. 16, 2010.

Extended European Search Report for EP Application No. 17171547.7, dated Nov. 8, 2017, 9 pages.

* cited by examiner

AIRBORNE ICE DETECTOR USING QUASI-OPTICAL RADAR

BACKGROUND

The present invention relates generally to optical ice detection, and in particular to a system and method of ice detection using quasi-optical radar.

An Optical Ice Detector (OID) may be configured to probe the airstream surrounding an aircraft to determine the properties of the clouds through which the aircraft is passing. Prior art OIDs utilize near-infrared beams with wavelengths that lie near 1 μm, which is less than the diameter of most water droplets and ice crystals within clouds. Because of this, the light scattering from the cloud is primarily due to Mie scattering for water droplets and geometric scattering for larger ice crystals. For Mie scattering caused by droplets larger than 3-4 μm, the scattering efficiency is nearly constant, and the scattering cross-section increases in proportion with the cross-sectional areas of the water droplets. Even though large droplets produce a backscatter signal greater than small droplets, the abundance of small droplets compared to the scarcity of large droplets in a cloud often causes the backscatter to be dominated by small droplet scattering.

For clouds in which the droplet number density with respect to diameter follows a mono-modal statistical distribution, the dominance of small-droplet backscatter creates no issue for cloud characterization. The mean or mode and the distribution shape parameter as derived from the backscatter signal allow determination of the number density of large droplets. For droplet size distributions with multiple modes, however, the presence of anomalous amounts of large droplets in a secondary mode can be difficult to detect. Such conditions may occur, for example, when cumulus clouds drizzle or rain into a lower stratiform cloud deck. If the temperature is below freezing, supercooled large droplets (SLD) that strike the leading edge of a wing can run back past icing protection systems and affect the aerodynamics of the aircraft. Thus, it is desirable for an aircraft crew to detect these SLDs during flight.

SUMMARY

An aircraft ice detection system is configured to determine a condition of a cloud and includes a radar system, a lidar system, optics and a dichroic filter. The radar system is configured to project quasi-optical radiation to the cloud and receive reflected quasi-optical radiation from the cloud. The lidar system is configured to project optical radiation to the cloud and receive reflected optical radiation from the cloud. The optics are configured to direct the quasi-optical radiation and the optical radiation to the cloud and receive the reflected quasi-optical radiation and the reflected optical radiation from the cloud. The dichroic filter is configured to direct the quasi-optical radiation from the radar system to the optics, direct the optical radiation from the lidar system to the optics, direct the reflected quasi-optical radiation from the optics to the radar system and direct the reflected optical radiation from the optics to the lidar system.

A method of detecting icing conditions for an aircraft includes projecting, by a radar system, quasi-optical radiation to a cloud through a dichroic filter and optics; projecting, by a lidar system, optical radiation to the cloud through the dichroic filter and the optics; receiving, by the radar system, reflected quasi-optical radiation from the cloud through the optics and the dichroic filter; and receiving, by the lidar system, reflected optical radiation from the cloud through the optics and the dichroic filter.

DETAILED DESCRIPTION

An ice detection system for an aircraft is disclosed herein that includes radar components that operate in the millimeter and/or submillimeter wavelength range. The radar components may stand alone or may be added to an optical ice detection system and work in conjunction with a lidar system, for example. The radar radiation lies in the "quasi-optical" range, which is radiation in the millimeter and sub-millimeter range of infrared wavelengths that lie just outside the "optical" spectrum but may still be reflected and focused using the same optics as are used for radiation in the optical spectrum.

Figure 1:
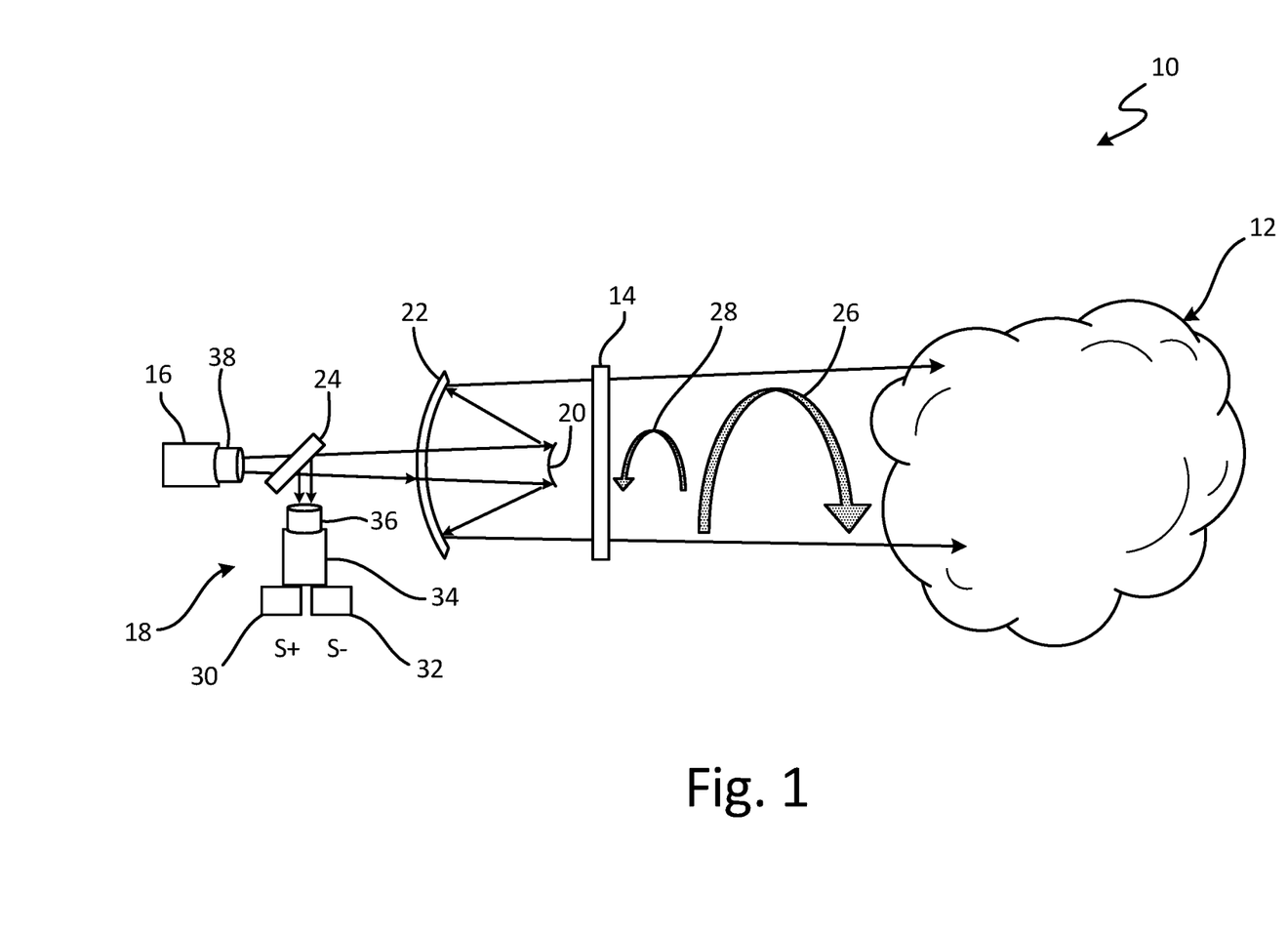
FIG. 1 is a diagram illustrating a radar ice detection system for determining characteristics of a cloud using quasi-optical radiation.

FIG. 1 is a diagram illustrating ice detection system 10 for determining characteristics of cloud 12. Ice detection system 10 includes window 14, radar transmitter 16, radar receiver 18, optics 20 and 22, and splitter 24. Radiation in the "quasi-optical" range having a first circular polarization 26 is provided to cloud 12. Based upon the content of cloud 12, a portion of the radiation is reflected back having a second circular polarization 28 orthogonal to the first polarization. Radar receiver 18 includes receivers 30 and 32, and duplexer 34. Optics 20 and 22 are configured as a Cassegrain telescope in the embodiment illustrated in FIG. 1, but may be implemented in any other configuration capable of directing infrared and quasi-optical radar radiation to, and receiving the reflected infrared and quasi-optical radar radiation from, cloud 12.

To accommodate detection of supercooled large droplets (SLDs) that may otherwise go undetected by optical ice detection (OID) systems, millimeter and submillimeter infrared radar may be utilized. For example, radar transmitter 16 may be configured to emit radiation in the IEEE G-Band (1 mm to 2.7 mm wavelength). Other wavelengths that lie close to the G-Band (e.g. 0.1 mm to 3 mm) may also be utilized such as, for example, sub-millimeter wavelengths. These wavelengths are often referred to as "quasi-optical" because while these wavelengths lie just outside the "optical" spectrum, beams of this wavelength may still be reflected and focused using the same optics as are used for radiation in the optical spectrum. Because of this, receivers 30 and 32 and transmitter 16 may utilize impedance-matching horns 36 and 38, respectively, to couple into free space rather than using bulky antennae.

Radar transmitter 16 is any device capable of emitting quasi-optical (e.g., IEEE G-Band) radar. The radar may be emitted with a circular polarization such as first circular polarization 26. The radiation is directed through splitter 24 to optics 20 and 22. Optics 20 and 22, which may be implemented as a Cassegrain telescope with metallic coated mirrors, for example, receive the radiation and direct the radiation through window 14 into cloud 12. Some of the radiation is reflected by cloud 12 as illustrated by second circular polarization 28 based upon conditions of the cloud. For example, droplets with a size greater than one tenth of the wavelength of the quasi-optical radiation may create backscatter of the quasi-optical radiation from cloud 12. The "handedness" of the reflected radiation may be reversed, as illustrated by second circular polarization 28, based upon the phase of cloud 12.

The reflected radiation from cloud 12 travels back through window 14 to optics 20 and 22. Optics 20 and 22 direct the reflected radiation to splitter 24. Splitter 24 directs the received reflected radiation to radar receiver 18. The reflected radiation is directed to duplexer 34, which may be a septum orthomode transducer, for example, and may be configured to separate the received radiation into separate orthogonal components. Receivers 30 and 32 are configured to receive the separate orthogonal components and provide an indication of intensity of the signals to a controller (not shown) for example. The relative intensities of the components received by receivers 30 and 32 are indicative of the phase of cloud 12 (i.e., the ratio of water particles to ice particles within cloud 12).

Figure 2A:
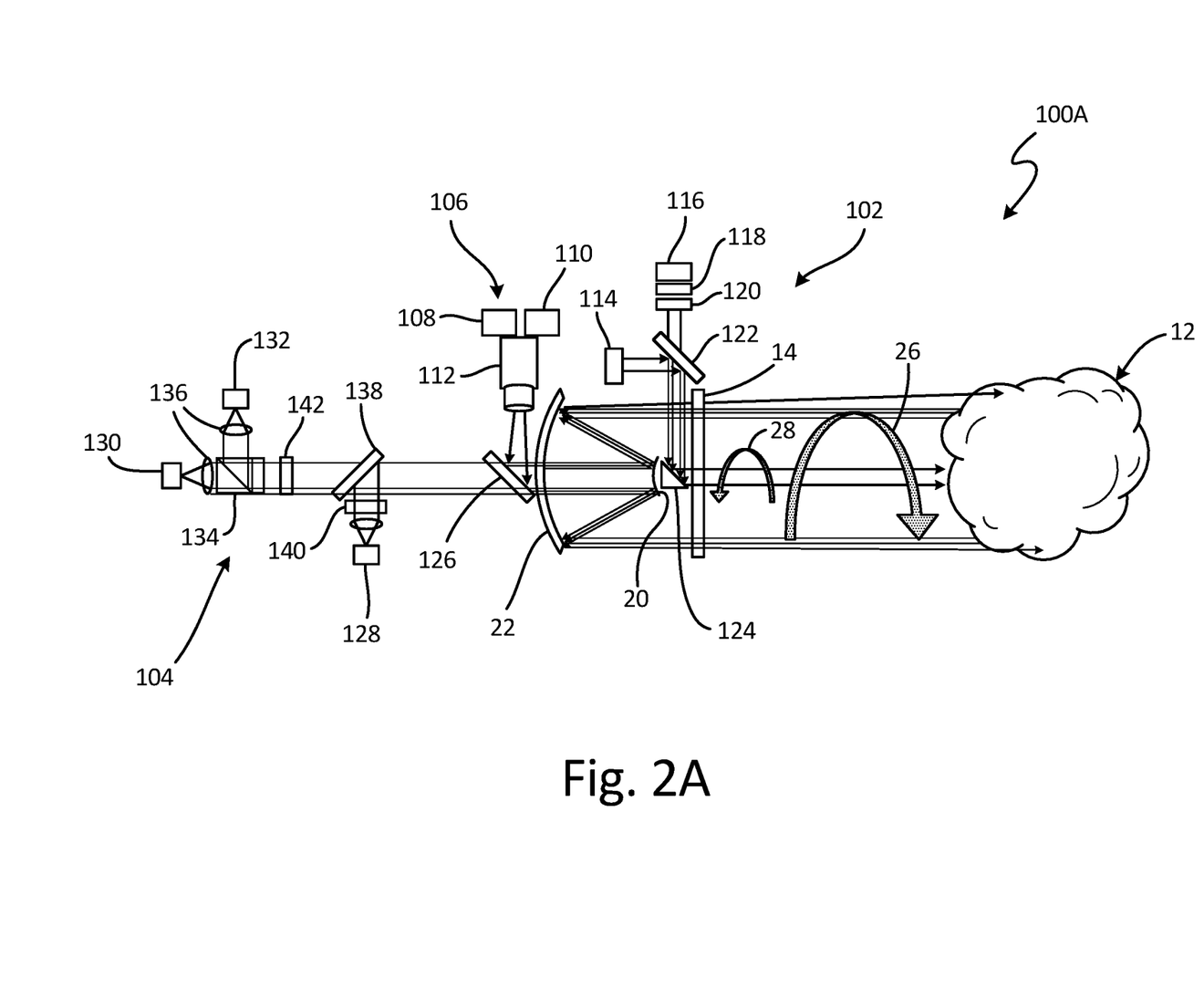
FIGS. 2A-2C are diagrams illustrating ice detection systems that utilize both optical and radar systems.

FIG. 2A is a diagram illustrating an ice detection system 100A that includes optical transmission components 102, optical receiving components 104, and radar components 106. Radar components 106 include radar transmitter 108, radar receiver 110 and duplexer 112. Optical transmission components 102 include light sources 114 and 116, linear polarizer 118, quarter waveplate 120, optical dichroic filter 122 and reflector 124. Optical receiving components 104 include optical/radar dichroic filter 126, optical receiving elements 128, 130 and 132, circularly polarizing beamsplitter 134, optics 136, optical dichroic filter 138 and bandpass filters 140 and 142. Optical transmission and receiving components 102 and 104 may be implemented, for example, as lidar components.

Light sources 114 and 116 may be laser diodes and/or any other light sources that emit radiation in the optical spectrum. In an embodiment, light source 116 may be a 905 nm laser diode and light source 114 may be a 1550 nm laser diode. The different wavelengths may be utilized by system 100A to detect different droplet conditions of cloud 12. Light source 116 may already emit linearly polarized light, but linear polarizer 118 may be implemented to ensure high polarization purity of the light from light source 116. Quarter waveplate 120 receives the linearly polarized light from light source 116 and transforms it into a circularly polarized illuminating beam.

Optical dichroic filter 122 may be configured to reflect light at wavelengths emitted by light source 114 and pass through light at wavelengths emitted by light source 116. This way, light from both light sources 114 and 116 may be provided to reflector 124 on a common path. The light from both light sources 114 and 116 is reflected by reflector 124 and provided to cloud 12. Reflector 124 may be implemented as a gold-plated mirror, for example, or any other reflective material such that the circular polarization of the light from quarter waveplate 120 is preserved.

The circularly polarized light from light source 116 and the light from light source 114 illuminate a volume of space in cloud 12. In response, moisture within cloud 12 causes backscattering of light from light sources 114 and 116. The backscatter of the circularly polarized light from light source 116 creates circularly polarized backscattered light which travels back through window 14 into optics 20 and 22.

Optics 20 and 22 direct the received optical backscatter from cloud 12 to optical/radar dichroic filter 126. Optical/radar dichroic filter 126 may be configured to pass through light at and around the visible ranges and reflect radiation of greater wavelengths. One such device is the 20TZBS02-C available from Newport Corporation of Irvine, Calif. The backscattered optical light passes through optical/radar dichroic filter 126 to optical dichroic filter 138. Optical dichroic filter 138 may operate in a similar manner as optical dichroic filter 122 to reflect light at wavelengths emitted by light source 114 and pass through light at wavelengths emitted by light source 116.

Optical dichroic filter 138 receives the optical backscattered light that passed through optical/radar dichroic filter 126. Optical dichroic filter 138 may be configured to reflect the 1550 nm light and pass through the 905 nm light. The reflected light may travel through bandpass filter 140 which may be configured to pass through the 1550 nm light and block all other wavelengths. The 1550 nm backscattered light then is received by optical receiving component 128. Optical receiving component 128 may be any device capable of outputting a signal indicative of received light such as, for example, photodiodes, phototransistors, or any other optical receiving devices. Optical receiving component 128 may be connected to a controller (not shown) which may receive a signal from optical receiving component 128 indicative of the intensity of the 1550 nm light.

Circularly polarizing beamsplitter 134 receives the reflected 905 nm light that passed through optical dichroic filter 138. Circularly polarizing beamsplitter 134 receives the 905 nm light which is comprised of right-hand circularly polarized (RCP) components and left-hand circularly polarized (LCP) components. Circularly polarizing beamsplitter 134 directs the RCP components to optical receiving component 130 and the LCP components to optical receiving component 132 through optics 136. Optical receiving components 130 and 132 may be any device capable of outputting a signal indicative of received light such as, for example, photodiodes, phototransistors, or any other optical receiving devices. Optical receiving components 130 and 132 may be connected to a controller (not shown) which may receive a signal from optical receiving components 130 and 132 indicative of the respective intensities of the RCP and LCP components of the 905 nm light. By receiving indication of both the RCP and LCP components, the controller is able to determine a phase of cloud 12.

Because of the quasi-optical nature of the radar radiation, radar components 106 may utilize the same optics 20 and 22 as optical components 104. Similar to the embodiment in FIG. 1, radar components 106 may be utilized to provide quasi-optical radiation to cloud 12 to accommodate detection of SLDs which may go otherwise undetected by optical components 104. Quasi-optical radiation, such as IEEE G-Band radar, may be emitted by radar transmitter 108. Radar transmitter 108 may generate linearly polarized radiation that is converted into circularly polarized radiation by a stepped septum of duplexer 112, which also isolates radar receiver 110 from radar transmitter 108. Duplexer 112 may be implemented as a septum orthomode transducer, for example. The circularly polarized radiation is provided to optical/radar dichroic filter 126. Because optical/radar dichroic filter 126 reflects the quasi-optical radiation, the radiation from radar transmitter 108 is directed to optics 20 and 22, and through window 14 to cloud 12.

For backscattering from spherical droplets within cloud 12, the circularity of polarization is preserved but opposite due to the back reflection (as illustrated by first and second polarizations 26 and 28). The backscattered radiation is reflected back through window 14 to optics 20 and 22 and then passes into duplexer 112. Duplexer 112 converts the reflected quasi-optical radiation back into a linearly polarized state orthogonal to that of radar transmitter 108, and this orthogonal state is then sensed by receiver 110. Receiver 110 may be connected to a controller (not shown) and provide an indication of the intensity of backscattered radiation received. Unlike optical components 104, which measure both states of circularly polarized backscatter to assess cloud phase, radar components 106 measure only one polarization state. Therefore, the phase of cloud 12 is determined by the measurements of optical components 104. Both water and ice produce some amount of scattering into this reversed circularly polarized state (i.e., second polarization 28), so that a completely glaciated cloud will still generate some amount of signal in a detectable state of polarization for radar components 106.

A controller connected to radar components 106 may make range-resolved measurements, for example, based upon the data obtained from receiver 110, either through time-of-flight of a short pulse of radiation or through frequency modulation of a continuous beam of radiation. The range-resolved backscatter measurements from receiver 110 may be processed in a manner similar to that of the lidar backscatter received by optical components 104. In this way, smaller droplet distributions may be detected by optical components 104, while larger droplets may be detected by the same ice detection system 100A using radar components 106.

Figure 2B:
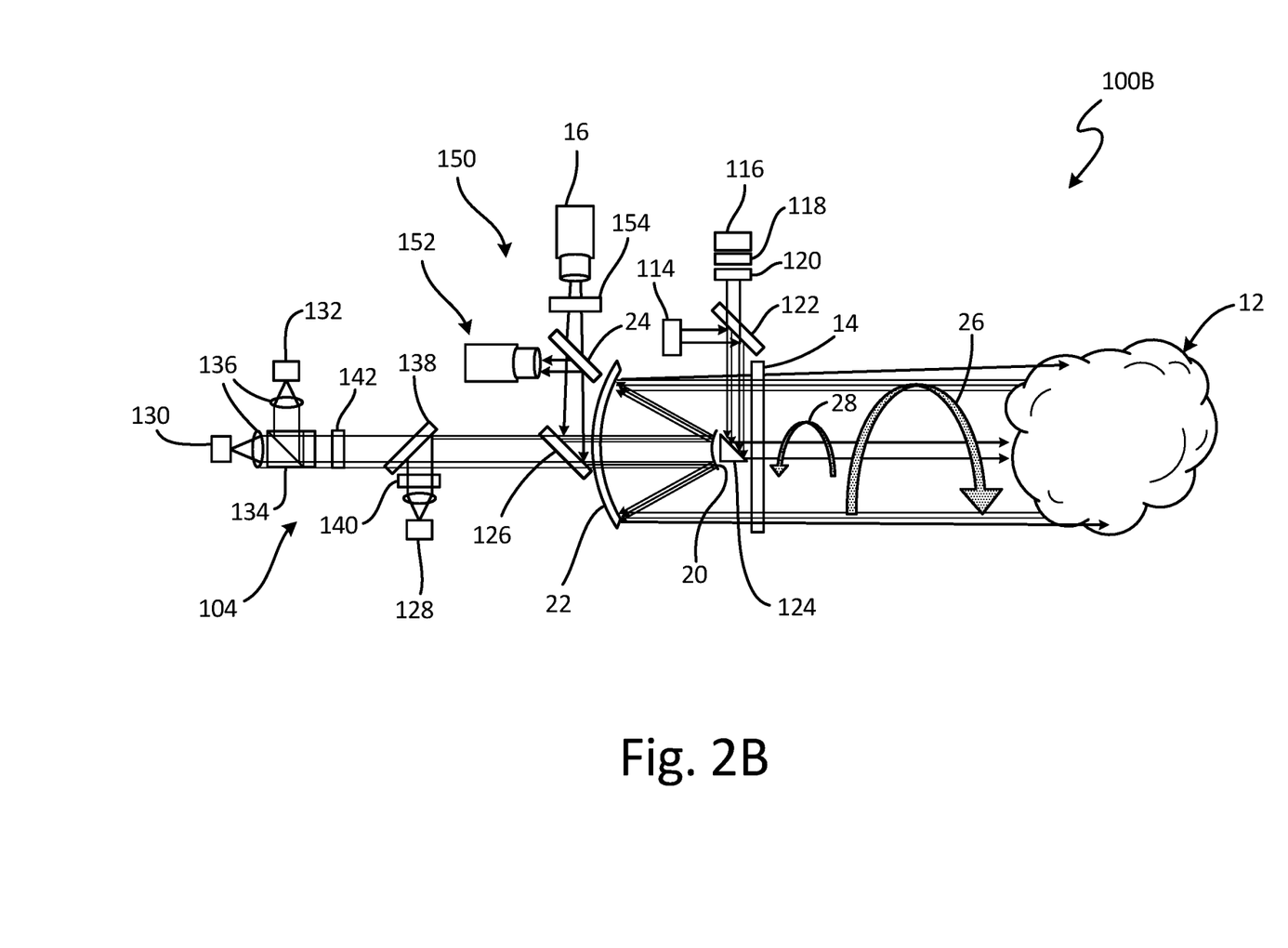

FIG. 2B is a diagram illustrating an ice detection system 100B that includes optical transmission components 102, optical receiving components 104, and radar components 150. Optical transmission components 102 and optical receiving components 104 operate as described above with reference to FIG. 2A. Radar components 150 include separate radar receiver 152 and radar transmitter 16, depolarizer 154 and splitter 24.

The linearly polarized output of transmitter 16 passes through depolarizer 154 followed by splitter 24, which may be a 3 dB splitter, for example. Depolarizer 154 may be a Cornu depolarizer, for example, which scrambles the polarization across the face of the quasi-optical beam. The beam from transmitter 16 is reflected by optical/radar dichroic filter 126 to optics 20 and 22 and through window 14 to cloud 12. Backscatter of the radar from cloud 12 is received through window 14 by optics 20 and 22, and is directed to receiver 152 by optical/radar dichroic filter 126 and splitter 24. Depolarization of the radar beam on transmission, and the lack of polarization sensitivity of receiver 152, ensure that backscatter from both water droplets and ice crystals are sensed in equal proportion. This allows a computation of the backscatter from cloud 12 regardless of the phase of cloud 12. Radar components 150 are unable to determine the phase of cloud 12, but cloud phase may be determined using optical components 104 because, in most cases, the small diameter and large diameter components should have the same phase.

Figure 2C:
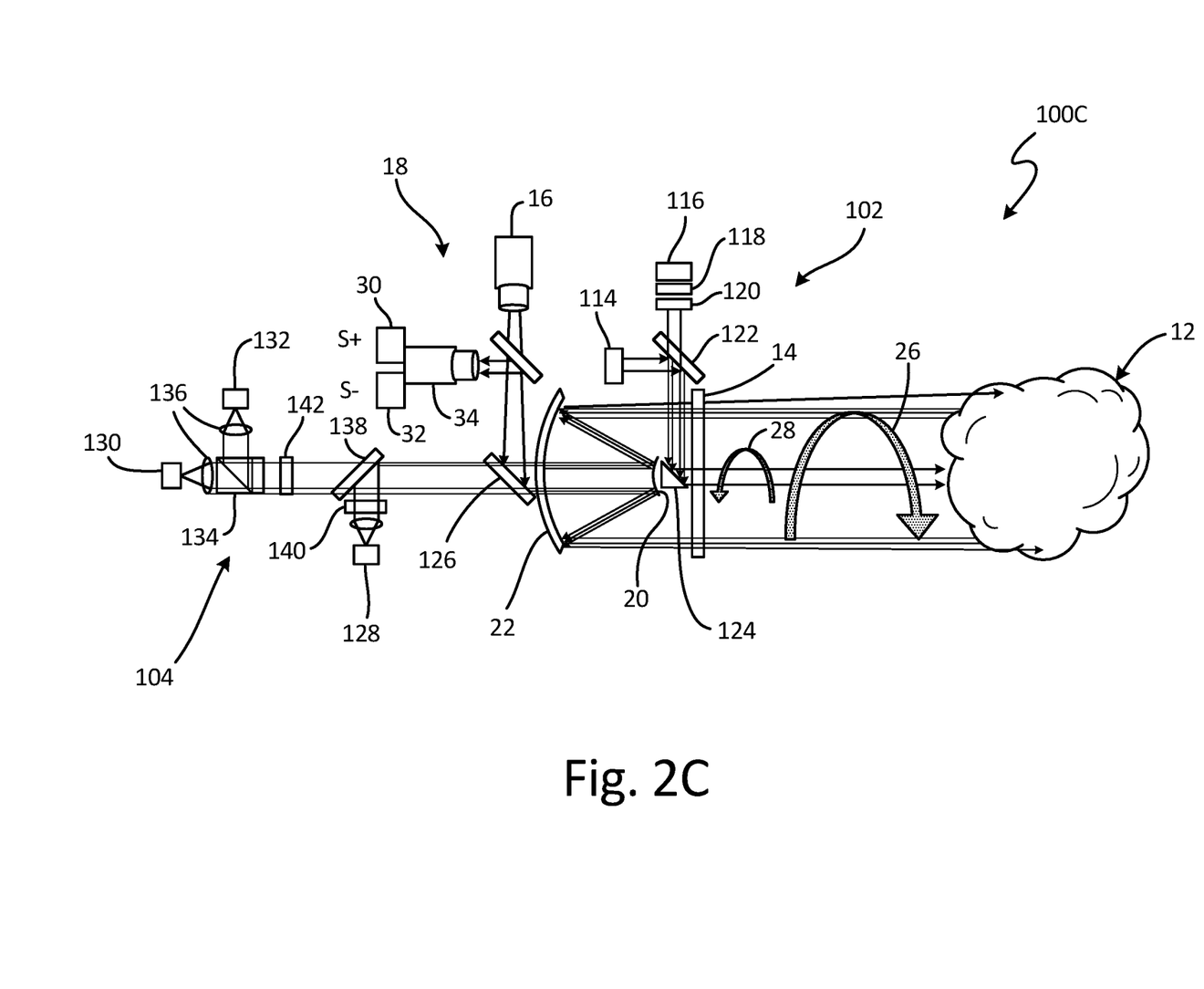

FIG. 2C is a diagram illustrating an ice detection system 100C that includes optical transmission components 102, optical receiving components 104, and radar components 16 and 18. Optical transmission components 102 and optical receiving components 104 operate as described above with reference to FIG. 2A. Radar components 16 and 18 operate as described above with reference to FIG. 1. One condition in which small diameter and large diameter droplets of cloud 12 have a different phase is the condition in which a cumulus cloud is snowing into a liquid stratiform cloud. System 100C is capable of detecting this condition. As described above with respect to FIG. 1, both LCP and RCP radar components are received by receivers 30 and 32 through duplexer 34. In this way, a controller (not shown) is able to determine the phase of cloud 12 for both large droplets (using radar receiver 18) and small droplets (using optical components 104) with the same ice detection system 100C. By utilizing radar in the quasi-optical range, radar components may be added to OIDs without changing the optics of the system, allowing detection of SLDs while maintaining the previous advantages of lidar ice detection systems.

Discussion of Possible Embodiments

The following are non-exclusive descriptions of possible embodiments of the present invention.

An aircraft ice detection system is configured to determine a condition of a cloud and includes a radar system, a lidar system, optics and a dichroic filter. The radar system is configured to project quasi-optical radiation to the cloud and receive reflected quasi-optical radiation from the cloud. The lidar system is configured to project optical radiation to the cloud and receive reflected optical radiation from the cloud. The optics are configured to direct the quasi-optical radiation and the optical radiation to the cloud and receive the reflected quasi-optical radiation and the reflected optical radiation from the cloud. The dichroic filter is configured to direct the quasi-optical radiation from the radar system to the optics, direct the optical radiation from the lidar system to the optics, direct the reflected quasi-optical radiation from the optics to the radar system and direct the reflected optical radiation from the optics to the lidar system.

The system of the preceding paragraph can optionally include, additionally and/or alternatively, any one or more of the following features, configurations and/or additional components:

A further embodiment of the foregoing system, wherein the radar system includes a radar transmitter configured to project the quasi-optical radiation, and a first radar receiver configured to receive the reflected quasi-optical radiation.

A further embodiment of any of the foregoing systems, wherein the radar system further includes a septum duplexer configured to generate a first circular polarization for the quasi-optical radiation, and direct a polarization component of the reflected quasi-optical radiation to the first radar receiver, wherein the polarization component is opposite the first circular polarization.

A further embodiment of any of the foregoing systems, wherein the radar system further includes a splitter, wherein the splitter directs the quasi-optical radiation to the dichroic filter, and wherein the splitter directs the reflected quasi-optical radiation from the dichroic filter to the first radar receiver.

A further embodiment of any of the foregoing systems, wherein the radar system further includes a second radar receiver, wherein the first radar receiver is configured to receive a first polarization component of the reflected quasi-optical radiation and the second radar receiver is configured to receive a second polarization component of the reflected quasi-optical radiation, and a septum duplexer configured to direct the first polarization component to the first receiver and the second polarization component to the second receiver, wherein the first polarization component is opposite a polarization of the quasi-optical radiation, and wherein the second polarization component is equal to the polarization of the quasi-optical radiation.

A further embodiment of any of the foregoing systems, wherein the quasi-optical radiation is radiation with a wavelength between 0.1 and 3 millimeters.

A further embodiment of any of the foregoing systems, wherein the optics are configured as a Cassegrain telescope with metallic-coated reflectors.

A further embodiment of any of the foregoing systems, wherein the lidar system includes a 905 nm laser diode and a 1550 nm laser diode, wherein an optical output of the 905 nm laser diode and an optical output of the 1550 nm laser diode comprise the optical radiation.

A further embodiment of any of the foregoing systems, wherein the lidar system includes a first optical receiver configured to receive a first polarization component of the reflected optical radiation, a second optical receiver configured to receive a second polarization component of the reflected optical radiation, and an optical transmitter configured to provide the optical radiation having a circular polarization, wherein the circular polarization is equal to the first polarization component and orthogonal to the second polarization component.

A further embodiment of any of the foregoing systems, wherein the lidar system further includes a polarizing beam splitter configured to direct the first polarization component to the first optical receiving and the second polarization component to the second optical receiver.

A method of detecting icing conditions for an aircraft includes projecting, by a radar system, quasi-optical radiation to a cloud through a dichroic filter and optics; projecting, by a lidar system, optical radiation to the cloud through the dichroic filter and the optics; receiving, by the radar system, reflected quasi-optical radiation from the cloud through the optics and the dichroic filter; and receiving, by the lidar system, reflected optical radiation from the cloud through the optics and the dichroic filter.

The method of the preceding paragraph can optionally include, additionally and/or alternatively, any one or more of the following features, configurations and/or additional components:

A further embodiment of the foregoing method, wherein projecting, by the radar system, the quasi-optical radiation includes projecting, by a radar transmitter, the quasi-optical radiation, and wherein receiving, by the radar system, the reflected quasi-optical radiation includes receiving, by a first radar receiver, the reflected quasi-optical radiation.

A further embodiment of any of the foregoing methods, wherein projecting, by the radar system, the quasi-optical radiation further includes polarizing, using a septum duplexer, the quasi-optical radiation with a circular polarization, and wherein receiving, by the radar system, the reflected quasi-optical radiation further includes directing, by the septum duplexer, a polarization component of the reflected quasi-optical radiation to the first radar receiver, wherein the polarization component is opposite the first circular polarization.

A further embodiment of any of the foregoing methods, wherein projecting, by the radar system, the quasi-optical radiation further includes directing the quasi-optical radiation from the transmitter to the dichroic filter using a splitter, and wherein receiving, by the radar system, the reflected quasi-optical radiation further includes directing, by the splitter, the reflected quasi-optical radiation from the dichroic filter to the first radar receiver.

A further embodiment of any of the foregoing methods, wherein receiving, by the radar system, the quasi-optical radiation further includes receiving, by the first radar receiver, a first polarization component of the reflected quasi-optical radiation from a septum duplexer; and receiving, by a second radar receiver, a second polarization component orthogonal to the first polarization component from the septum duplexer, wherein the second polarization component is equal to a transmitted polarization of the quasi-optical radiation.

A further embodiment of any of the foregoing methods, wherein projecting, by the radar system, the quasi-optical radiation includes projecting radiation with a wavelength between 0.1 and 3 millimeters.

A further embodiment of any of the foregoing methods, wherein the optics are configured as a Cassegrain telescope with metallic-coated reflectors.

A further embodiment of any of the foregoing methods, wherein projecting, by the lidar system, the optical radiation includes projecting the optical radiation using a 905 nm laser diode and a 1550 nm laser diode.

A further embodiment of any of the foregoing methods, wherein receiving, by the lidar system, the reflected optical radiation includes receiving, by a first optical receiver, a first polarization component of the reflected optical radiation; and receiving, by a second optical receiver, a second polarization component of the reflected optical radiation; wherein transmitting, by the lidar system, the optical radiation comprises transmitting the optical radiation having a circular polarization, wherein the circular polarization is equal to the first polarization component and orthogonal to the second polarization component.

A further embodiment of any of the foregoing methods, wherein receiving, by the first optical receiver, the first polarization component includes directing the first polarization component to the first optical receiver using a polarization beam splitter, and wherein receiving, by the second optical receiver, the second polarization component includes directing the second polarization component to the second optical receiver using the polarizing beamsplitter.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An aircraft ice detection system configured to determine a condition of a cloud, the system comprising:
   a radar system configured to project quasi-optical radiation to the cloud at a wavelength selected to detect supercooled large droplets by reflection from supercooled large droplets in the cloud and receive reflected quasi-optical radiation from the cloud, wherein the quasi-optical radiation is radiation with a wavelength between 0.1 and 3 millimeters, wherein the radar system comprises:
      a radar transmitter configured to project the quasi-optical radiation;
      a first radar receiver configured to receive the reflected quasi-optical radiation and
      a septum duplexer configured to generate a first circular polarization for the quasi-optical radiation, and direct a polarization component of the reflected quasi-optical radiation to the first radar receiver, wherein the polarization component is opposite the first circular polarization;
   a lidar system configured to project optical radiation to the cloud and receive reflected optical radiation from the cloud;
   optics configured to direct the quasi-optical radiation and the optical radiation to the cloud and receive the reflected quasi-optical radiation and the reflected optical radiation from the cloud; and a dichroic filter configured to direct the quasi-optical radiation from the radar system to the optics, direct the optical radiation from the lidar system to the optics, direct the reflected quasi-optical radiation from the optics to the radar system and direct the reflected optical radiation from the optics to the lidar system.

2. The system of claim 1, wherein the radar system further comprises a splitter, wherein the splitter directs the quasi-optical radiation to the dichroic filter, and wherein the splitter directs the reflected quasi-optical radiation from the dichroic filter to the first radar receiver.

3. The system of claim 1, wherein the radar system further comprises:
   a second radar receiver, wherein the first radar receiver is configured to receive a first polarization component of the reflected quasi-optical radiation and the second radar receiver is configured to receive a second polarization component of the reflected quasi-optical radiation; and
   a septum duplexer configured to direct the first polarization component to the first receiver and the second polarization component to the second receiver, wherein the first polarization component is opposite a polarization of the quasi-optical radiation, and wherein the second polarization component is equal to the polarization of the quasi-optical radiation.

4. The aircraft ice detection system of claim 1, wherein the optics are configured as a Cassegrain telescope with metallic-coated reflectors.

5. The aircraft ice detection system of claim 1, wherein the lidar system comprises:
   a 905 nm laser diode; and
   a 1550 nm laser diode, wherein an optical output of the 905 nm laser diode and an optical output of the 1550 nm laser diode comprise the optical radiation.

6. The aircraft ice detection system of claim 1, wherein the lidar system comprises:
   a first optical receiver configured to receive a first polarization component of the reflected optical radiation;
   a second optical receiver configured to receive a second polarization component of the reflected optical radiation; and
   an optical transmitter configured to provide the optical radiation having a circular polarization, wherein the circular polarization is equal to the first polarization component and orthogonal to the second polarization component.

7. The system of claim 6, wherein the lidar system further comprises a polarizing beam splitter configured to direct the first polarization component to the first optical receiving and the second polarization component to the second optical receiver.

8. A method of detecting icing conditions for an aircraft, the method comprising:
   projecting, by a radar system, quasi-optical radiation to a cloud through a dichroic filter and optics at a wavelength selected to detect supercooled large droplets by reflection from supercooled large droplets in the cloud, wherein the quasi-optical radiation is radiation with a wavelength between 0.1 and 3 millimeters, wherein projecting, by the radar system, the quasi-optical radiation comprises projecting, by a radar transmitter, the quasi-optical radiation, and wherein receiving, by the radar system, the reflected quasi-optical radiation comprises receiving, by a first radar receiver, the reflected quasi-optical radiation and
   wherein projecting, by the radar system, the quasi-optical radiation further comprises polarizing, using a septum duplexer, the quasi-optical radiation with a circular polarization, and wherein receiving, by the radar system, the reflected quasi-optical radiation further comprises directing, by the septum duplexer, a polarization component of the reflected quasi-optical radiation to the first radar receiver, wherein the polarization component is opposite the first circular polarization;
   projecting, by a lidar system, optical radiation to the cloud through the dichroic filter and the optics;
   receiving, by the radar system, reflected quasi-optical radiation from the cloud through the optics and the dichroic filter; and
   receiving, by the lidar system, reflected optical radiation from the cloud through the optics and the dichroic filter.

9. The method of claim 8, wherein projecting, by the radar system, the quasi-optical radiation further comprises directing the quasi-optical radiation from the transmitter to the dichroic filter using a splitter, and wherein receiving, by the radar system, the reflected quasi-optical radiation further comprises directing, by the splitter, the reflected quasi-optical radiation from the dichroic filter to the first radar receiver.

10. The method of claim 8, wherein receiving, by the radar system, the quasi-optical radiation further comprises:
    receiving, by the first radar receiver, a first polarization component of the reflected quasi-optical radiation from a septum duplexer; and
    receiving, by a second radar receiver, a second polarization component orthogonal to the first polarization component from the septum duplexer, wherein the second polarization component is equal to a transmitted polarization of the quasi-optical radiation.

11. The method of claim 8, wherein the optics are configured as a Cassegrain telescope with metallic-coated reflectors.

12. The method of claim 8, wherein projecting, by the lidar system, the optical radiation comprises projecting the optical radiation using a 905 nm laser diode and a 1550 nm laser diode.

13. The method of claim 8, wherein receiving, by the lidar system, the reflected optical radiation comprises:
    receiving, by a first optical receiver, a first polarization component of the reflected optical radiation; and
    receiving, by a second optical receiver, a second polarization component of the reflected optical radiation;
    wherein transmitting, by the lidar system, the optical radiation comprises transmitting the optical radiation having a circular polarization, wherein the circular polarization is equal to the first polarization component and orthogonal to the second polarization component.

14. The method claim 13, wherein receiving, by the first optical receiver, the first polarization component comprises directing the first polarization component to the first optical receiver using a polarization beam splitter, and wherein receiving, by the second optical receiver, the second polarization component comprises directing the second polarization component to the second optical receiver using the polarizing beamsplitter.

* * * * *